US007055381B2

(12) United States Patent
Bochkor et al.

(10) Patent No.: US 7,055,381 B2
(45) Date of Patent: Jun. 6, 2006

(54) METHOD OF TESTING TIRES FOR DURABILITY

(75) Inventors: Christopher Gerard Bochkor, Akron, OH (US); Paul Anthony Bowers, Hartville, OH (US); Linda Rozelle Hirschfelt, Uniontown, OH (US); Michael David Marley, Massillon, OH (US); Michael John Monnot, Uniontown, OH (US); Gary William Richards, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 49 days.

(21) Appl. No.: 10/886,875

(22) Filed: Jul. 8, 2004

(65) Prior Publication Data

US 2006/0005616 A1    Jan. 12, 2006

(51) Int. Cl.
*G01M 17/02* (2006.01)
(52) U.S. Cl. ..................................... 73/146; 152/154.1
(58) Field of Classification Search .................. 73/146, 73/1
See application file for complete search history.

(56) References Cited

U.S. PATENT DOCUMENTS 3,529,048 A * 9/1970 Kovac et al. ............... 264/502
3,724,137 A * 4/1973 Hofelt et al. ............... 451/254
3,914,907 A * 10/1975 Hofelt et al. ............... 451/28
4,047,338 A * 9/1977 Gormish et al. ............ 451/1
4,475,383 A * 10/1984 Fischer et al. .............. 73/146
4,691,564 A * 9/1987 Potts et al. .................. 73/146
4,856,324 A * 8/1989 Potts ........................... 73/146
5,645,465 A * 7/1997 Vannan, III .................. 451/5
6,405,146 B1 * 6/2002 Engel ........................ 702/105
6,673,184 B1 * 1/2004 Brown et al. ............... 156/133
6,729,179 B1 * 5/2004 Crema et al. ................ 73/146
2002/0000275 A1 * 1/2002 Fogel, Sr. ................. 152/154.1
2003/0037608 A1 * 2/2003 Crema et al. ................ 73/146

* cited by examiner

*Primary Examiner*—Edward Lefkowitz
*Assistant Examiner*—Andre Allen
(74) *Attorney, Agent, or Firm*—Howard M. Cohn

(57) ABSTRACT

A laboratory test for general tire durability can produce results comparable to the GM-ATE road test. A passenger tire is mounted in a test machine and run at approximately 50 mph (80 kph), at maximum rated inflation pressure, with at least 100% maximum rated radial load, with approximately 25% of the test duration being performed with lateral force comprised of approximately equal portions of right and left steering, the remainder of the test being performed without lateral force (straight portions). A test segment comprises repeating a loading cycle a plurality of times until approximately 5000 miles have accumulated, and multiple test segments are performed until 16,000 miles have been accumulated. The test is paused and the tire is visually inspected several times during the test segments, including at the end of the test.

19 Claims, 1 Drawing Sheet

METHOD OF TESTING TIRES FOR DURABILITY

TECHNICAL FIELD OF THE INVENTION

The invention relates to testing the durability of pneumatic tires.

BACKGROUND OF THE INVENTION

Generally, there are two ways of testing the durability of a tire: (i) mounting the tire (i.e., a set of tires) on a vehicle and driving it on an actual roadway (this is called "road test"), and (ii) mounting the tire in a test machine which imposes stresses (e.g., radial loading) on the tire and running the tire on the test machine (this is called "laboratory test"). In both cases, measurements can be made while operating (driving, running) the tire, such as measuring tire temperature, stresses imposed upon a wheel (rim) to which the tire is mounted, etc. Additional observations can also be made after operating the tire (including during pauses in operating the tire), such as visual analysis of the condition and appearance of the tire. An example of a test machine 100 for is shown in FIG. 1.

A tire 102 being tested is mounted to a wheel (rim) 104 and is inflated to normal operating pressure (e.g., 32 psi; 220 kPa). The rim 104 rotates on an axle 106, about an axis of rotation. The tire is either free to rotate (passive, driven), or is rotated (active, driving) by a variable speed motor (not shown) driving the axle 106—hence rotating the tire 102. The tire 102 is typically a light passenger tire having an outside diameter of approximately 24"–30" (609 mm–792 mm). However, it is within the terms of the present invention to use larger tires as required. A braking device (not shown), such as a simple disc brake (or dashpot), may be provided on the axle 106 to provide drag when the tire 102 is freewheeling (passive).

A road wheel 122 is provided. The road wheel 122 has a larger diameter than the tire—typically approximately 67" (1.7 m). The road wheel 122 rotates on an axle 126, about an axis of rotation. The axle 126 is nominally parallel to the axle 106. The road wheel 122 is either free to rotate (passive), or is rotated (active) by a variable speed motor (not shown) driving the axle 126—hence rotating the road wheel. The road wheel 122 may have a smooth surface, or the surface may have a topology (e.g., irregularities such as bumps, holes, grooves, etc). In this example, the road wheel 122 has a generally smooth surface, simulating a well paved roadway. A braking device (not shown), such as a simple disc brake (or dashpot), may be provided on the axle 126 to provide drag when the road wheel 122 is freewheeling (passive).

The respective axles 106 and 126 are each supported by sets of bearing blocks (not shown) on either side of the tire 102 and wheel 122, respectively. If it is desired to move the axle, the respective sets of bearing blocks are movable by any conventional means, such as by a cylinder actuator or ball-and-screw connection. For example, the tire 102 may be moved in an out of engagement with the road wheel 122 by moving the tire axle 106 towards or away from the road wheel axle 126, as indicated by the arrows labeled a and a'. (Conversely, the tire axle 106 can remain stationary and the road wheel axle 126 can be moved towards or away from the tire axle 106.) More engagement equates to more radial load (radial with respect to the tire).

The bearing blocks (on either or both of the tire axle 106 or road wheel axle 126) can also be provided with strain gauges (not shown) for taking measurements of loads induced when the tire 102 is engaged against the road wheel 122. All of this can be under computer control (not shown) so that, for example, a bump in the road can be simulated by suddenly increasing, then decreasing the engagement of the tire and road wheel, and a dip or valley in the road can be simulated by decreasing, then increasing the engagement of the tire and road wheel, all according to a predetermined test regimen (protocol).

Additional degrees of freedom may be provided to simulate actual driving conditions in the laboratory. For example, the axle 106 can be pivoted (in the plane of the drawing sheet) about a point p at the center of the tire 102, as indicated by the arrows labeled b and b'. This simulates camber. By way of further example, the axle 106 can be mounted in the machine so that it can be rotated about an axis 108, as indicated by the arrow labeled c. This simulates steering forces.

Additional degrees of freedom may be provided, as desired, to simulate other tire driving conditions. For example, the axle 106 can be moved back and forth axially, as indicated by the arrows labeled d and d' to simulate skidding conditions. Again, all of this can be under computer control (not shown) so that a wide range of actual driving conditions can be simulated, all according to a predetermined test regimen (protocol). And, as mentioned, sensors (not shown) can provide measurements during the test regimen.

In this example of a test machine 100, the tire axle 106 is shown as having all the degrees of freedom. It should be understood, as briefly mentioned above, that the road wheel axle 126 can be provided with comparable degrees of freedom, as may be desired.

A number of tires can be mounted on the test machine—for example, at least two tires on at least two rims on the same axle (106), and running on the same road wheel (122). (A suitably wide road wheel would be required.) Or at least two tires on at least two rims on at least two circumferentially displaced axles, and running on the same road wheel. Or combinations of the above.

FIG. 1A shows a computer (COMPUTER) for controlling the test machine 100 and running the laboratory test. The usual input/output peripherals (KEYBOARD, DISPLAY, ETC.) are provided. The computer controls the motor(s) (MOTOR(S)) driving the tire axle 106 and/or the road wheel axle 126, the braking devices (BRAKING DEVICE(S)), if any, associated with the tire axle 106 and/or the road wheel axle 126, the actuator(s) (ACTUATOR(S)) controlling the degrees of freedom for the tire axle 106 and/or the road wheel axle 126, and gathers data from any sensors, gauges, etc. (SENSORS, GAUGES, etc.) associated with the tire 102 and/or road wheel 122.

As is relevant to the present invention, the purpose of a laboratory test is to obtain information about the durability of the tire. This can be for "internal" purposes, such as testing new (prototype) tire designs, and can also be for obtaining acceptance ("certification", if you will) of an existing (or a proposed) production tire design.

A road test currently in use and having acceptance in the industry is the "GM-ATE" test which is performed on public highways in Texas. (The ATE road test is specified by General Motors (GM).) A problem with road testing is that it is time consuming, logistically challenging, and can readily be profoundly adversely affected by road hazards (debris on the highway) which may be encountered.

What is needed is a laboratory test which can produce results which are comparable to those obtained by the GM-ATE road test.

BRIEF DESCRIPTION (SUMMARY) OF THE INVENTION

It is therefore a general aspect of the invention to establish a laboratory test for general tire durability.

It is a more specific aspect of the invention to provide a protocol for testing tires in the laboratory which can produce results comparable to the GM-ATE road test.

According to the invention a laboratory test has been designed and can be performed which will test general tire durability, and which is capable of producing substantially equivalent (comparable) results as a given road test, such as the known GM-ATE road test.

According to the invention, a method of testing a passenger tire for durability, comprises:

mounting the tire in a test machine;

running the tire at approximately 50 mph (80 kph), at maximum rated inflation pressure, with at least 100% maximum rated radial load, with approximately 25% of the test duration being performed with lateral force comprised of approximately equal portions of right and left steering, the remainder of the test being performed without lateral force (straight portions); and with the radial load held constant, performing a loading cycle consisting of 225 seconds at zero lateral force,
10 seconds to ramp to positive lateral force,
75 seconds at positive lateral force,
10 seconds to ramp to zero lateral force,
225 seconds at zero lateral force,
10 seconds to ramp to negative lateral force,
75 seconds at negative lateral force and, finally,
10 seconds to ramp to zero lateral force.

According to an aspect of the invention, the lateral force is approximately 130 pounds (60 kg force); the radial load is set to 122% of T&RA (Tire and Rim Association) maximum load at maximum rated inflation pressure for the entire duration of the test; the tire inflation pressure is approximately 35 psi (240 kPa); and the lateral force is ±8% of T&RA maximum load at maximum rated inflation pressure.

According to a feature of the invention, a test segment comprises repeating the loading cycle a plurality of times until approximately 5000 miles have accumulated, and multiple test segments are performed until 16,000 miles have been accumulated.

According to a feature of the invention, the test is paused and the tire is visually inspected several times during the test segments, including at the end of the test. The tire may also be inspected for internal damage using shearography.

According to an aspect of the invention, three tires of a given construction are tested, and if any of the three tires sustain visual damage during the test, the tire construction meets the end of the test condition.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
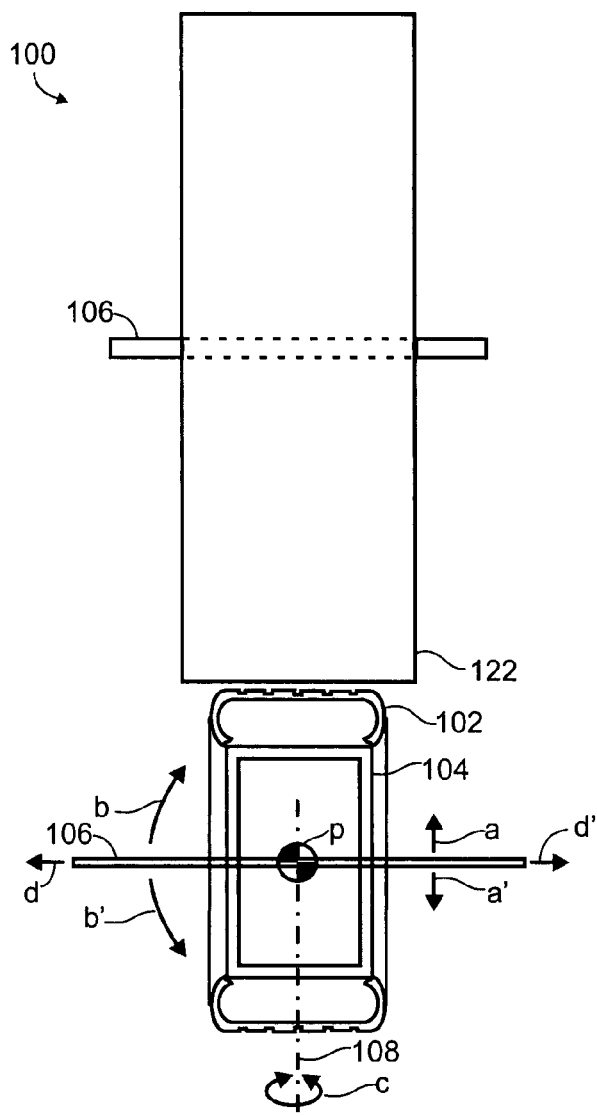

The structure, operation, and advantages of the present preferred embodiment of the invention will become further apparent upon consideration of the following description taken in conjunction with the accompanying figures (FIGs), wherein:

FIG. 1 is a schematic illustration of a top view of a laboratory machine with a tire mounted thereon. The tire is shown in cross-section.

Figure 1A:
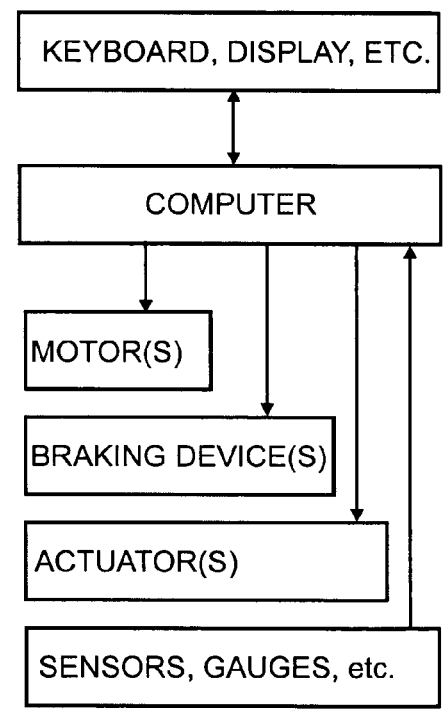

FIG. 1A is a schematic illustration of a control system for the laboratory machine of FIG. 1.

DETAILED DESCRIPTION OF THE INVENTION

The method of the present invention is particularly useful for the development of light tires. It is faster and more consistent than the existing vehicle (road) test, particularly the GM-ATE road test. The GM-ATE vehicle test is conducted on public highways in Texas. Seasonal changes can cause variation in the test results. In addition, tires lost due to road hazard damage result in loss of information and increased time and cost. Laboratory testing also provides an opportunity to accelerate the test using conditions not suitable for public highways, reducing the time at test. The laboratory test of the present invention completes in three weeks versus two months for the GM-ATE vehicle (road) test. Also, the laboratory test suitably uses only three tires while the vehicle requires a minimum of four tires (i.e., one for each of the four wheels of the test vehicles) plus two or three spares.

The laboratory test is run on a test machine (see FIG. 1) having a roadwheel (road wheel), such as described hereinabove—for example a 67" (1.7 m) diameter smooth roadwheel with lateral force control capability. Radial forces (a, a') can also be controlled.

The test is performed at a set temperature, such as 100 degrees F. (39 degrees C.)±(delete preceding minus sign) 10 degrees F. This temperature is an industry and NHTSA (National Highway Traffic Safety Association) standard for tire durability testing.

The tire inflation pressure is set to a specified maximum rated inflation, such as 35 psi (240 kPa)±2 psi. This "maximum" rating is also an industry standard, set by the T&RA (Tire and Rim Association). The inflation pressure is set with the tire at ambient temperature and is capped, allowing the pressure to change during the test.

The laboratory test is conducted at a speed suitable for the operating range of the tire being evaluated, such as 50 mph (80 kph). Once set, the speed is controlled to within (±)2 mph.

The loading strategy for the laboratory test includes straight rolling portions interspersed with steering portions. Both right and left steering is included. The amount of steering is controlled by the magnitude of the imposed lateral force.

The magnitude of the radial load is set to be between 50% and 150% of a (e.g., the T&RA) maximum rated load at maximum rated inflation pressure. Once set, the radial load is controlled within 3% of the set load or 75 pounds force (34 kg force), whichever is greater. Radial load is maintained essentially constant throughout the test.

Alternatively, the radial load could be varied throughout the test. On a vehicle, radial load varies due to the roll of the vehicle during cornering maneuvers. Because the curved road wheel increases the severity in the belts more than in the mid and lower sidewall, the load was modified to match the severity in the road test. The result was constant radial load for this particular test. It may not be constant for a different test.

The magnitude of the lateral force can vary between 2% and 45% of a maximum load at maximum rated inflation pressure. Once set, the lateral load is controlled within 10 pounds force (4.5 kg force)

As mentioned above (FIG. 1), the test machine (100) is capable of simulating camber and steering forces. As used herein, "lateral force" is a force acting on the tire/wheel due to any combination of camber (b/b') and steer (c). In this particular test protocol, the lateral force is imposed via steer only, but there is no restriction in this regard as far as the test machine is concerned. Another test protocol (to simulate a test other than the GM-ATE test) might require that both camber and steer be used to generate the lateral force.

The magnitudes of the radial and lateral loads, as well as the speed, are established to provide the desired mode (mechanical damage and/or thermal degradation) and extent of damage in critical internal tire locations. This may be based on results obtained in a vehicle (road) test that the laboratory test seeks to emulate. For this test (emulating the GM-ATE road test), the desired mode is mechanical damage. Simulation of a different vehicle test might require a different mode of damage. The desired damage mode is determined during the development of the laboratory test. Other test parameters are set to maintain the desired mode. This would be magnitude of loads and speed.

With a wide variety of tire constructions available, broad parameter ranges are needed to ensure appropriate end of test conditions.

Tires are visually inspected on a regular basis. The test is terminated if visual damage is observed. Typically, the tire is stopped from rotating so that it can be visually inspected.

Typically, it is the road wheel that is driven (rotated by a motor), rather than the tire, and braking is not part of the test protocol (other than braking/stopping to allow for visual inspection).

Measurements may be taken during the test (see SENSORS, GAUGES, etc.; FIG. 1A). The machine control system records measurements used by the control feedback system. Other than for the intended load control purposes, and to shut down the machine in case of catastrophic tire damage that might cause damage to the machine, the test itself does not make use of these measurements. During the development of the test, various data can be monitored for verification purposes.

EXAMPLE 1

For a P225/60R16 radial passenger tire, a laboratory test representative of highway vehicle testing would be targeted at 50 mph (80 kph), 35 psi (240 kPa) inflation pressure, 1960 pounds force (890 kg force) radial load, 130 pounds (60 kg force) lateral load with 25% of the test duration comprised of equal portions of right and left steering. It should be understood that these numbers are approximately, ± acceptable test variations.

A drive file, running on the computer (see FIG. 1A) is used to instruct the test machine.

The drive file consists of a 640 second cycle that is repeated for a specific number of times.

The radial load is set to 122% of the T&RA maximum load at maximum rated inflation pressure for the entire duration of the test.

The lateral force is ±8% of the T&RA maximum load at maximum rated inflation pressure. In other words, the lateral force changes throughout the test from +8%, to 0, to −8% (left, neutral, right steering). When going straight, the lateral load is 0.

With the radial load held constant, the loading cycle consists of:

225 seconds at zero lateral force,
10 seconds to ramp to positive lateral force,
75 seconds at positive lateral force,
10 seconds to ramp to zero lateral force,
225 seconds at zero lateral force,
10 seconds to ramp to negative lateral force,
75 seconds at negative lateral force and, finally,
10 seconds to ramp to zero lateral force.
640 total seconds (10⅔ minutes)=1 "test segment"

Ramping prevents overshooting the target (i.e., the next lateral force setting) and subsequent correction. The duration of the ramp is dependent on the response rate of the machine control system. Transitions (e.g., between positive and zero lateral force) are determined as appropriate for the test machine being used. 10 seconds is adequate. 5 seconds may be adequate, depending on the nature of the machine.

The cycle is repeated until 5000 miles have accumulated. This is a "test segment". At 50 mph, this would be 100 hours (not taking into account pauses for visual inspection), or about 4 days. With speed held constant, using the above loading cycle (640 seconds), 100 hours=360,000 sec=562.5 loading cycles.

The test segment may be repeated for another 5000 miles, etc. (multiple test segments), as desired.

The tires are preferably visually inspected once per 8 hour shift. At 50 mph, 8 hrs=400 miles=8% of the 5000 mile test segment. The test is terminated if visual damage is observed.

A tire completing 16,000 miles without visual damage passes the test. (3.2 test segments) The inventors have observed that 16,000 miles produces results which are roughly equivalent to 45,000 miles for the (GM-ATE) road test. There is no tolerance for this particular test. The tire either survives 16,000 miles without visible damage or it doesn't. Just as in the GM-ATE road test, the tire either survives 45,000 miles without visible damage or it doesn't. A different protocol to simulate a different road test would have a different completion/pass distance.

Three tires of each construction are tested. All three must pass the test for the tire construction to pass. If any of the three sustain visual damage during the test, the tire construction does not pass.

All three tires can be tested simultaneously, on the same road wheel. At the end of the test, and during the aforementioned pauses, the tire is visually inspected for damage. Optionally, at the end of the test and during the aforementioned pauses, the tire may be removed and checked for internal damage using shearography.

Shearography is a non-destructive method used to look for separations in a tire or casing. The method of measurement is based on electronic Phase-Shearing-Interferometry. The shearogram is directly measured with a digital camera. The tire surface is illuminated with coherent light generated by a laser diode. A stationary image is taken of the tire and stored, then a vacuum is pulled on the tire and another image is taken and stored. The two images are subtracted and what you obtain is an image showing separations in the tire.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. Method of testing a radial passenger tire for durability, comprising the steps of:
   mounting the tire in a test machine;
   running the tire at approximately 50 mph (80 kph), at maximum rated inflation pressure, with at least 100% maximum rated radial load, with approximately 25% of the test duration being performed with lateral force comprised of approximately equal portions of right and left steering, the remainder of the test being performed without lateral force (straight portions); and
   with the radial load held constant, performing a loading cycle consisting of 225 seconds at zero lateral force,
   75 seconds at positive lateral force,
   225 seconds at zero lateral force, and
   75 seconds at negative lateral force.

2. Method, according to claim 1, wherein
   the lateral force is approximately 130 pounds (60 kg force);
   the radial load is set to 122% of T&RA maximum load at maximum rated inflation pressure for the entire duration of the test;
   the tire inflation pressure is approximately 35 psi (240 kPa); and
   the lateral force is ±8% of T&RA maximum load at maximum rated inflation pressure.

3. Method, according to claim 1, including the steps of ramping to positive lateral force in 10 seconds,
   ramping to zero lateral force in 10 seconds,
   ramping to negative lateral force in 10 seconds, and
   ramping to zero lateral force in 10 seconds.

4. Method, according to claim 1, wherein
   a test segment comprises repeating the loading cycle a plurality of times until approximately 5000 miles have accumulated.

5. Method, according to claim 4, further comprising performing multiple test segments.

6. Method, according to claim 5, further comprising performing multiple test segments until 16000 miles have been accumulated.

7. Method, according to claim 5, further comprising pausing the test and visually inspecting the tire several times during the test segments, including at the end of the test.

8. Method, according to claim 5, further comprising during selected pauses in the test segments, and at the end of the test, removing the tire and checking for internal damage using shearography.

9. Method, according to claim 1, wherein the tire is driven by a roadwheel.

10. Method, according to claim 1, wherein the roadwheel is a smooth roadwheel.

11. Method, according to claim 1, wherein three tires of a given construction are tested, and if any of the three tires sustain visual damage during the test, the tire construction meets the end of the test condition.

12. Method of testing a tire for durability, comprising:
    mounting the tire in a test machine comprising a road wheel,
    engaging the tire with the road wheel;
    causing the tire to be rotated at a speed;
    setting a radial load on the tire;
    controlling lateral forces on the tire; and
    further comprising setting the radial load to be between 50% and 150% of a maximum rated load at a maximum rated inflation pressure, and maintaining the radial load is essentially constant throughout the test.

13. Method, according to claim 12, wherein the road wheel is smooth.

14. Method, according to claim 12, further comprising performing the test at 100 degrees F. ±10 degrees F.

15. Method, according to claim 12, further comprising setting the tire inflation pressure to a specified maximum rated inflation.

16. Method, according to claim 12, wherein the tire inflation pressure is set with the tire at ambient temperature and the tire is capped, allowing the pressure to change during the test.

17. Method, according to claim 12, further comprising controlling the speed of the tire to within ±2 mph.

18. Method, according to claim 12, further comprising establishing a loading strategy which includes straight rolling portions interspersed with steering portions.

19. Method of testing a tire for durability, comprising:
    mounting the tire in a test machine comprising a road wheel,
    engaging the tire with the road wheel;
    causing the tire to be rotated at a speed;
    setting a radial load on the tire;
    controlling lateral forces on the tire; and
    further comprising controlling the lateral force to be between 2% and 45% of a maximum load at maximum rated inflation pressure.

* * * * *